United States Patent Office 3,376,246
Patented Apr. 2, 1968

3,376,246
POLYVINYL CHLORIDE PLASTISOLS HAVING GREATLY IMPROVED PROPERTIES
David L. Valentine and Dean C. Finney, Kingsport, Tenn., assignors to Eastman Kodak Company, Rochester, N.Y., a corporation of New Jersey
No Drawing. Continuation-in-part of application Ser. No. 434,663, Feb. 23, 1965. This application Feb. 7, 1966, Ser. No. 525,372
27 Claims. (Cl. 260—31.6)

This application is a continuation-in-part of our copending application Ser. No. 434,663 for Polyvinyl Chloride Plastisols Having Greatly Improved Properties filed on Feb. 23, 1965, and now abandoned.

This invention relates to new polyvinyl chloride (PVC) systems, and particularly to PVC plastisol and organosol systems exhibiting greatly improved adhesion to a wide variety of substrates such as metal, glass, ceramic, wood and plastic, and finding considerable utility as a bonding agent or coating therefor.

Polyvinyl chloride plastisol and organosol systems have been particularly useful in the manufacture of molded articles such as auto floor mats, duck decoys, toys, decorative objects, and for coating fabrics. However, these systems have not achieved their full potential due to their limited adherence to many substrates in the absence of some supplementary adhesion producing additive or primer coating. Exemplary of important potential uses thus far eluding polyvinyl chloride systems is the coating of uncleaned steel wherein the lubricating oils employed in processing the steel prevent good adherence. This problem and applicant's solution thereof are further developed below.

Among the many proposals of the plastics industry for overcoming this adherence deficiency is the application of a primer coating of such materials as vinyl copolymers, acrylic, phenolic, epoxy, polyester and polyurethane resins to the substrate prior to application of the polyvinyl chloride systems. The use of a primer coat, however, suffers certain disadvantages such as the necessity for a two-coat operation requiring of course more time and equipment than the single-coat operation. Further, if a thermoplastic primer such as a vinyl copolymer is used, it must be air or force dried to remove the volatile solvents. The application problem is further complicated when a thermosetting primer such as a heat-setting phenolic resin is employed since most thermosetting resins have a critical curing cycle and are subject to being undercured or overcured. Moreover, the dark color generated in some of these primer resins is a significant and limiting factor. It is also important to note that no single primer is suitable for every application and, therefore, careful determinations of the effects of many such primers on the characteristics of the PVC system must be made before deciding upon the type and amount of primer to be employed.

Another proposal is the modification of the plastisol or organosol system itself. This can be done in various ways including: (1) employing a PVC copolymer rather than straight PVC. Pliovic AO dispersion resin (The Goodyear Tire & Rubber Company), a maleic modified PVC resin, and Bakelite VMCH solution resin (Union Carbide Chemical) are typical resins specifically intended for this purpose; and (2) replacing all or part of the conventional plasticizer portion of the system by polymerizable materials which cross-link or polymerize as the vinyl is fused. In this regard, certain unsaturated polyesters in combination with cross-linking monomers and catalysts have been employed, however, the cost of these additives, the processing problems, and the poor viscosity stability of the PVC systems have discouraged this approach.

Objects of the present invention, therefore, are: to provide easily preparable and improved PVC systems, particularly PVC plastisols and organosols, exhibiting exceptional adhesion to a variety of substrates including cold-rolled steel; and to provide a commercially practicable process for preparing and using the same.

These and other objects hereinafter appearing have been achieved in accordance with the present invention through the discovery that the adherence of PVC systems, with or without plasticizers, and without the need for primers and other such expedients, is remarkably increased by the incorporation of an unsaturated polyester having the recurring unit of the formula $$\{G_1—A_1—G_2—A_2\}$$

wherein —$G_1$— and —$G_2$— are residues of diols selected from the group consisting of 2,2,4-trimethyl-1,3-pentanediol (TMPD), 2,2-bis (p-hydroxy cyclohexyl) propane referred to hereinafter as hydrogenated Bisphenol A or HBPA, and 2,2-dimethyl-1,3-propanediol (NPG), —$A_1$— is the residue of a dibasic acid selected from the group consisting of o-phthalic, isophthalic, terephthalic, tetrahydrophthalic, fumaric, adipic, succinic, maleic, itaconic, mesaconic and citraconic, and —$A_2$— is the residue of an unsaturated dibasic acid selected from the group consisting of fumaric, maleic, itaconic, mesaconic and citraconic, having molecular weights of up to about 4,000 and especially those of molecular weights within the range of from about 1,000 to about 3,500 as measured by the standard ebullimetric technique employing the rate of rise of boiling point of benzene, and having an acid number of less than about 50 and preferably in the range of from about 5 to about 25. It is particularly noteworthy that the plastisol formulations of the present invention have significantly improved adhesion to lubricated cold-rolled steel and the like, probably due to the absorption of the oil by the plastisol. The enlarged utility of the present invention, therefore, evidences a substantial contribution to the plastisol art.

It is noted that it may be advantageous for certain applications to substitute up to about 50% by weight of the above acids with such acids as abelaic, sebacic, suberic, glutaric, or other aliphatic dibasic acids, and such modifications are within the purview of the present invention. Also included within the scope of our invention is the use of unsaturated polyesters having the recurring unit of the formula 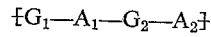, in which $A_1$, $A_2$, $G_1$ and $G_2$ are as defined hereinbefore, and also containing small amounts of a polyhydric alcohol, e.g., a triol, or a polybasic acid, e.g., a tribasic acid.

Depending upon the intended application the plasticizer system content may be varied between wide limits, but, preferably between about 30 and 100 parts per 100 parts of polymer. Likewise the unsaturated polyester content may be widely varied, but preferably is between about 10 and 60 parts per 100 parts of polymer. It is particularly noted that although practical considerations will play a large part in determining the upper and lower limits of these concentrations, such limits do not diminish the comprehensive character of the present invention, that is, the novel concept of introducing the present unsaturated polyesters into PVC containing systems to greatly improve the adhesion thereof.

It shall become apparent from the present disclosure that an almost infinite variety of formulations may be perceived within the scope of the present invention by those skilled in the art in order to meet certain desired specifications. It should be kept in mind, however, that the present invention is entirely unique in providing a unitary, integrated PVC containing system which will bond well to a variety of surfaces such as metal, ceramic, glass, wood and other substrates. In this regard, a typical one of the present highly adherent formulations comprises the PVC resin, PVC plasticizer, TMPD maleate, PVC stabilizer, diluents, fillers and pigments. In comparison, other polyesters of TMPD such as the isophthalate/fumarate polyester are preferably, if not necessarily supplemented by a cross-linking monomer and catalyst in the plastisol formulation.

In order to more clearly illustrate the variety of plasticizers useful in practicing the present invention, the following discussion is thought to be in order. Plasticizers may be defined as high boiling organic liquids or low melting solids which are added to an otherwise hard or tough resin to impart flexibility thereto. In the simplest terms, the main difference between ordinary solvents and plasticizers is volatility, which in the case of plasticizers, is quite low. The plasticizer's softening action (plasticization) is usually attributed to its ability to reduce the intermolecular attractive forces of the polymeric system. This plasticizing action may be theorized in either of the following ways:

(1) The attractive forces between the resin molecules are reduced by neutralization of the charges of the molecules by the plasticizer. In other words, the polymer molecules are "tied-up" and are no longer available to attract adjacent molecules. When these attractions between polymer and plasticizer are strong, a true solvent action occurs and the plasticizer is called a "solvent type"; and (2) The plasticizer forces the polymer molecules apart. Thus, distance alone is used to soften the polymer. In this instance, the physical attraction is obtained by sheer force. If the attraction between the polymer and plasticizer is negligible, the plasticizer is called a non-solvent type and the plasticizer functions merely as a spacer. Because the plasticizer is inserted and placed in position under heat (fusion), the molecular forces of the polymer exert a force upon the plasticizer when the compound returns to room temperature equilibrium, and in many cases, the non-polar plasticizer will be forced out. This condition is known as exudation or "spew."

Plasticizers may be structurally clasified either as monomeric or polymeric, and functionally, they may be classified as primary and secondary. Monomeric plasticizers are simple monoesters or diesters of monobasic and dibasic acids or alcohols. Polymerics are complex polyesters of dibasic acids and dihydric alcohols having much higher molecular weights than monomerics, ranging from about 800 to 7,000.

Primary plasticizers are compounds that can be used as the sole plasticizer. The most common types are the phthalates, the phosphates, dibasic acid esters, and polymeric plasticizers. DOP (di-2-ethylhexyl phthalate) is the most widely used general purpose plasticizer. Such general purpose plasticizers provide an even balance of compound properties after fusion and are suited for plastisols because of the good flow properties provided. The most efficient plasticizers for vinyls are dibasic acid esters which provide maximum flexibility over a wide temperature range and also impart good flow properties to plastisols. Phosphate plasticizers are used primarily to impart flame retardant and chemical resistant properties to vinyl formulations. Polymeric polyesters and relatively high-molecular-weight monomeric plasticizers are used as primary plasticizers in applications requiring maximum permanence because of their resistance to migration, extraction, and volatilization. Satisfactory plastisol viscosity is obtained by using combinations of polymeric and general purpose plasticizers.

Secondary plasticizers are used in vinyl formulations to lower compound cost and to obtain specific compound properties. The type and amount of secondary used in any formulation is limited by the side effects on compound properties such as physical properties, color, stability, extractability and volatility. The chlorinated types are used for chemical and flame resistance, the epoxy type for light and heat stability, and the extender type for lower compound cost. The polymeric type epoxy plasticizers improve heat and light stability. Monomeric epoxy plasticizers are slightly less effective heat stabilizers but provide improved low temperature flex. The following Table I contains a listing of a number of useful plasticizers and the outstanding characteristic imparted to vinyl plastics thereby.

TABLE 1.—CHEMICAL COMPOSITION AND OUTSTANDING CHARACTERISTICS OF PLASTICIZERS

| Monomeric Type | Outstanding Characteristic |
|---|---|
| (DOP) Di-(2-ethylhexyl) phthalate | General purpose. |
| (DIOP) Di(2-ethyl-4-methylpentyl) phthalate | Do. |
| (DCP) Di-capryl phthalate | Do. |
| (DIDP) Di-isodecyl phthalate | Low volatility. |
| Di-(2-ethylhexyl) hexahydrophthalate | General purpose. |
| Cresyl diphenyl phosphate | Low volatility, flame resistance. |
| (TCP) Tricresyl phosphate | Do. |
| (DOA) Di-(2-ethylhexyl) adipate | Low temp. |
| (DOS) Di-(2-ethylhexyl) sebacate | Low temp. light stability. |
| (DOZ) Di-(2-ethylhexyl) azelate | Low temp. |
| Monomeric epoxy (2-ethyl-hexylepoxytallate). | Heat and light stability, low temp. |
| Triethylene glycol dicaprylate | Heat stability, high thixotropy. |
| Acetyl tributyl citrate | Non-toxicity. |
| (TXIB) 2,2,4-trimethylpentane-1,3-diol diisobutyrate. | Low viscosity. |

| Polymeric Type | |
|---|---|
| Polyester of NPG and adipic acid (M.W.=1,200–1,300). | Permanence. |
| Epoxidized Soy Bean Oil (M.W. approx. 1,000). | Heat and light stability. |
| Polyester of TMPD and Adipic Acid terminated with the monoisobutyrate of TMPD (M.W.=800–1,000). | Permanence. |

| Extender Type | |
|---|---|
| Chlorinated resinous paraffin (volatile liquids to solids). | Chemical resistance. |
| Liquid aromatic hydrocarbon mixtures (M.W.=100–800). | Viscosity improver. |
| High boiling (above about 200° C.) liquid mixture of partially hydrogenated terphenyls. | Do. |
| Iso-octyl palmitate | Viscosity and light stability. |

An ideal plasticizer would have the following properties: complete compatibility with the polymer, excellent permanence, highly efficient over a wide temperature range, odorless, tasteless, non-flammable, non-toxic, highly stable, and contributing to ease of processing. Of course, no one plasticizer can fulfill all of these requirements, but some blends do come close. Quite often some compromise or sacrifice in certain properties are necessary. The following Table 2 illustrates the effects of various combinations of plasticizers, unsaturated polyesters and stabilizers. In the table, TXIB represents the diisobutyric acid ester of TMPD.

TABLE 2

| Resin: PVC dispersion resin | 100 | 100 | 100 | 100 |
|---|---|---|---|---|
| Stabilizers: | | | | |
| Epoxidized soy bean oil | 5 | 5 | 5 | |
| Dibasic lead phthalate | | | | 5 |
| Plasticizer: | | | | |
| DOP | 10 | 50 | 50 | 80 |
| TXIB | 30 | 20 | 20 | 20 |
| Polyester: TMPD Maleate | 20 | 20 | 40 | 20 |
| Total parts of Plasticizer and Polyester | 60 | 90 | 110 | 120 |
| Tensile Strength, p.s.i. | 2,200 | 1,900 | 1,500 | 1,500 |
| 100% Modulus, p.s.i. | 1,810 | 660 | 670 | 510 |
| Ultimate Elongation, percent | 180 | 450 | 330 | 460 |
| Elongation Retention, Percent at 100° C. | 22 | 56 | 61 | 67 |
| Tear Resistance, p.p.i. | 390 | 180 | 200 | 150 |
| Shore "A" Durometer Hardness, 5 sec. | 84 | 63 | 60 | 57 |
| Soapy Water Ext. (1% soln.): Loss, Percent | 0.5 | 2.9 | 2.3 | 0.3 |
| Oil Extraction: Loss, Percent | 1.2 | 8.6 | 3.1 | 24 |
| Heptane Extraction: Loss, Percent | 6.7 | 28 | 20 | 43 |
| Activated Carbon Extraction: | | | | |
| Loss, Percent | 4.5 | 10 | 4.9 | 2.5 |
| Thickness, mils | 10 | 11 | 12 | 12 |
| Torsion Modulus, ° C.: | | | | |
| 35,000 p.s.i. | −16 | −45 | −35 | −47 |
| 135,000 p.s.i. | −41 | <60 | <60 | <60 |
| Accelerated Weathering: | | | | |
| Hand | 3/1 | −1/0 | 3/0 | 0/0 |
| Color | 1/−1 | 1/−1 | 1/−1 | −1/1 |
| Exudation | 0/0 | 1/0 | 0/0 | 1/−1 |
| Viscosity Poises (Brookfield, No. 4 spindle, 6 r.p.m. 23° C.) after aging— | | | | |
| 1 day | 656 | 500 | 566 | 78 |
| 7 days/Percent Inc. over 1 day | 740/13 | 525/5 | 590/2 | 92/18 |
| 14 days/Percent Inc. over 1 day | 840/28 | 595/19 | 660/17 | 100/28 |
| 21 days/Percent Inc. over 1 day | 850/30 | 625/25 | 670/19 | 105/34 |

Many of the present PVC systems need only be heated to fuse the PVC and form thereby a homogeneous blend of PVC, plasticizer, stabilizer and other ingredients. The present invention also envisages, however, the incorporation of polymerization catalysts, with or without cross-linking agents, into the system, and a curing cycle at elevated temperature to cause the unsaturated polyester to react and give a harder more solvent resistant product. Such cross-linking cures work best with films of greater than about 5 mil thickness and are preferably employed with films of greater than about 15 mil thickness. Useful cross-linking agents include 1,3-butylene glycol dimethacrylate, diallyl phthalate, TMPD-mono and/or dimethacrylates, neopentyl glycol dimethacrylate and/or diacrylate, preferably in concentrations of from about 5/1 to 1/1 ratios of unsaturated polyester component to cross-linking agent. Useful free-radical catalysts include benzoyl peroxide, ditertiarybutyl peroxide and tertiarybutyl perbenzoate. The cure is carried out at a temperature of from about 150 to about 200° C. for a period of time sufficient to cause cross-linking. It is noted that a significant aspect of the present invention is the discovery that the cure exotherm of TMPD maleate, NPG maleate, or HBPA maleate in the PVC systems is so low that no detectable thermal degradation of the PVC occurs. Also, it was found that the shrinkage of this polyester upon curing was exceptionally low and thus enhanced both the dimensional stability and adherence of the PVC coatings and adhesives. The following Table 3 illustrates the advantages in employing the present unsaturated polyesters as well as cross-linking agents in 20 mil film coatings.

Table 3a, which follows, illustrates the advantages obtained when the unsaturated polyester employed in our invention is a copolyester of 2,2,4-trimethyl-1,3-pentanediol (TMPD), 2,2 - bis(p - hydroxycyclohexyl)propane (HBPA), isophthalic acid (IPA), and maleic acid (MA).

TABLE 3

| | Parts by Weight | | | |
|---|---|---|---|---|
| PVC dispersion resin | 100 | 100 | 100 | 100 |
| TMPD Maleate [1] | 25 | 25 | 25 | 25 |
| DIOP | 20 | 20 | 20 | 20 |
| DOP | 20 | 20 | 20 | 20 |
| TXIB | 30 | 30 | 30 | 30 |
| Epoxidized soy bean oil | 5 | 5 | 5 | 5 |
| Dibutyl tin maleate | 1 | 1 | 1 | 1 |
| TMPD Methacrylate [2] | | | 30 | |
| 1,3-butylene glycol dimethacrylate | | | | 7 |
| Di-t-butylperoxide | | | 0.3 | 0.7 |
| Viscosity (Poises, after aging 1 day, 23° C., Brookfield viscometer, 6 r.p.m.) | 95 | 127 | 18 | 50 |
| Peel [3] (lbs./in.): | | | | |
| At 2 in./min | ¼ | 4 | 15 | 15 |
| At 20 in./min | ¼ | 5 | 25 | 25 |

[1] NPG maleate, HBPA maleate, or TMPD/Adipate/Maleate also may be used effectively as this component and each gives increased adhesion similar to that observed with TMPD maleate.
[2] Actually a mixture of TMPD di- and mono-methacrylate. A 3/1 ratio of di-/mono- was used for this evaluation, but, other blends also work effectively.
[3] Value for peeling a 20 mil thick, one inch wide strip from cold-rolled steel on an Instron Tensile Tester at the designated rate.

TABLE 3A

| | Parts by Weight | | | |
|---|---|---|---|---|
| PVC "low soap" dispersion resin | 100 | 100 | 100 | 100 |
| TMPD/HBPA/IPA/MA [1] | 25 | | 25 | |
| TMPD MALEATE | | 25 | | 25 |
| DIOP | 20 | 20 | 20 | 20 |
| DOP | 20 | 20 | 20 | 20 |
| TXIB | 30 | 30 | 30 | 30 |
| Epoxidized Soybean Oil | 5 | 5 | 5 | 5 |
| Dibutyl Tin Maleate | 1 | 1 | | |
| 1,3-butylene glycol dimethacrylate | | | 7 | 7 |
| Di-t-butylperoxide | | | 0.07 | 0.07 |
| Peel [2] (lbs./in.): | | | | |
| At 2 in./min. (10 mil) | 8 | 6 | 6 | 4 |
| At 2 in./min. (75 mil) | 18 | 4 | 30 | 20 |

[1] NPG/HBPA/IPA/MA polyester also can be used effectively as the unsaturated polyester and gives increased adhesion similar to that observed with TMPD/HBPA/IPA/MA polyester.
[2] Value for peeling a one inch wide strip from cold-rolled steel on an Instron Tensile Tester at the designated rate.

Plastisols containing the unsaturated polyesters, with or without a cross-linking agent, may be prepared by conventional blending techniques. For example, the polyester may be dissolved in a conventional vinyl plasticizer and the solution then added with stirring to a dispersion grade PVC resin. From about 5 to about 15 percent (based on PVC content) of a stabilizer such as lead carbonate or about 1 to about 3 percent (based on PVC content) of a stabilizer such as dibutyl tin maleate may be added along with a conventional free-radical catalyst such as benzoyl peroxide, di-t-butyl peroxide or t-butyl perbenzoate. When employed, the catalyst concentration is preferably between 0.1 and 2.0 percent, but, higher concentrations are useful. The exact ratio of polyester to plasticizer is not critical and can be varied to fit specific applications such as dip coatings, spray coatings and hand lay-ups. In general, higher bond strengths are achieved by using as low a ratio of plasticizer to polyester as possible. Useful adhesive strengths can be obtained by the addition of 5 to 75 parts of polyester to 100 parts of plasticizer.

A wide range of conventional vinyl plasticizers may be employed, including DOP [di(2-ethylhexyl) phthalate], dioctyl adipate, butyl benzyl phthalate, the diisobutyrate of 2,2,4-trimethyl-1,3-pentanediol, and polymeric plasticizers such as poly(2,2,4-trimethyl-1,3-pentanediol adipate) terminated with the monoisobutyrate acid ester of 2,2,4 - trimethyl - 1,3 - pentanediol, and poly(2,2 - dimethyl-1,3-propanediol adipate) terminated with 2-ethylhexanol. Cost considerations as well as desired viscosity and adhesion properties of the system affect the specific plasticizer choice. Where lower viscosity is desired without further plasticizer, for example, for spray coating application, small amounts of a diluent (5–15%) such as toluene, xylene, methyl isoamyl ketone, diisobutyl ketone and the like may be added to form the sprayable organosol.

An important consideration in preparing the present PVC systems is that in order for an unsaturated additive to be useful, it must be compatible with the polymer at the level used. Table 4 below shows the compatibility of several unsaturated polyesters in plasticizers at an 80/20, plasticizer/polyester ratio blend. The unsaturated polyesters prepared from NPG, HBPA, and TMPD were compatible with all the plasticizers tested at this level. The only other unsaturated polyester found to have such a wide compatibility range was oxypropylated Bisphenol A, i.e., 2,2-bis[4(2-methyl, 2-hydroxy ethoxy) phenyl] propane, however, this material had to be supplemented with a catalyst and a cross-linking monomer such as diallyl phthalate or butylene glycol dimethacrylate in order to achieve useful adhesion. Propylene glycol/ isophthalic/maleic unsaturated polyester achieved some adhesion only when butyl benzyl phthalate was used as the plasticizer. It is particularly noteworthy, therefore, that the maleate polyesters of TMPD, HBPA, or NPG apparently not only exhibit total compatibility with vinyl plasticizers, but, also result in a marked increase in adhesion when employed as the sole additive in a PVC system.

and may be characterized as a white powder having particles of from about 1 to about 3 microns, a specific gravity of about 1.4 g./cc., a bulk density of about 16 to 21 lbs./ft.$^3$, and a specific viscosity of about 0.5. The present invention is also applicable, however, to other PVC resins which are not formed by emulsion polymerization and which are blendable with the plasticizers and other ingredients by milling, banburying, calendering, extrusion and the like techniques. The fluidized bed type of PVC resin is also useful herein. Especially preferred for use in our invention are those PVC resins with little or no residual soap from the polymerization. These resins are commonly called "low soap" or "no soap" resins and are exemplified by the commercially available resins Tenneco 1730 and Geon 120x203.

It is noted that the present invention also has utility for improving to varying degrees the adhesion of certain other polymers such as methyl methacrylate, polyvinyl acetate, acrylonitrile-butadiene rubbers, eth- TABLE 4.—COMPATIBILITY OF SEVERAL UNSATURATED POLYESTERS WITH VARIOUS PLASTICIZERS AT A 20% POLYESTER CONCENTRATION

| Example | Unsaturated Polyesters | DIOP | Di-2-ethyl-hexyl Phthalate | Di-2-ethyl-hexyl Adipate | Diisodecyl Phthalate | Butyl Benzyl Phthalate | TXIB | TMPD-MI Adipate | TMPD-MI Benzoate |
|---|---|---|---|---|---|---|---|---|---|
| (1) | TMPD/Isophthalic/Fumaric | C | C | C | C | C | C | C | C |
| (2) | TMPD/Maleate (or NPG/Maleate) | C | C | C | C | C | C | C | C |
| (3) | NPG/Phthalic/Maleic | C | C | C | I | C | I | I | I |
| (4) | Propylene Glycol/Isophthalic/Maleic | I | I | I | I | I | I | I | I |
| (5) | Propylene Glycol/Maleate | I | I | I | I | C | I | I | I |
| (6) | Propylene Glycol-Ethylene Glycol/Phthalic/Maleic | I | I | I | I | | I | I | I |
| (7) | Oxypropylated Bisphenol-A | C | C | C | C | C | C | C | C |
| (8) | 1,3-butylene Glycol Maleate | I | I | I | I | | I | I | I |
| (9) | HBPA/Maleic | C | C | C | C | C | C | C | C |

C = Compatible; I = Incompatible.
TMPD-MI Adipate = The adipic acid ester of TMPD monoisobutyrate.
TMPD-MI Benzoate = The benzoic acid ester of TMPD monoisobutyrate.
DIOP = di(2-ethyl-4-methylpentyl) phthalate.

Since the present polyesters are solid materials at room temperature, they should first be dissolved in or blended with the selected plasticizer for ease of dispersion into the PVC system. The viscosity of these blends of polyester and plasticizer will vary widely according to the viscosity of the plasticizers used and the concentration of the polyester. For example, a 50/50 blend of DOP and TMPD maleate has a viscosity of 950 poises as measured on the Brookfield viscometer, Model LVF, spindle No. 4, speed 6 r.p.m., at 73° F., while a 50/50 blend of TXIB blend of TMPD maleate has a viscosity of only 165 poises. By lowering the TMPD maleate concentrations the viscosity may be lowered quite significantly. For example, a 1:1:1, TMPD maleate:DOP:TXIB blend has a viscosity of only 22 poises which is an excellent viscosity for blending with the PVC. These solid polyesters may be heated to about 125° C. to facilitate their blending with the plasticizer. The resultant polyester-plasticizer blend is then blended with the PVC by the same techniques normally used for incorporating straight plasticizer to form the plastisol.

It is noted that the characteristics of the stabilizers are quite important in formulating the present plastisol or organosol system. It has been found that at least about 0.5% by weight of the following stabilizers are exceptionally useful in practicing the present invention: Epoxidized soybean oil (av. MW=1000; 6.5-7.0% by wt. epoxy groups, sg. 20/20° C. of about 0.996); dibasic lead phthalate; dibutyl tin maleate; and metal-organic complexes, in particular, the tin-liquid organic complex of sg.=1.13 of Argus Chemical Corp. sold under the name of Mark 275. Other use stabilizers include 2-ethylhexyl-epoxytallate, epoxidized linseed oil, and dibasic lead phosphate. Generally, from about 0.5 to about 5% by weight of these sttabilizers is preferred.

The PVC resins to which the present invention is particularly applicable are those of high molecular weights prepared by emulsion polymerization and are usually referred to as "dispersion grade" resins. These resins are sold under such trade names for example as Geon 121 ylenevinyl acetate, chlorinated rubbers, polyvinyl acetate-chloride, epoxy and cellulose nitrate. However, the advantages thus obtained are of a lesser order than that obtained with the preferred PVC systems.

As indicated above various oils such as derived from animal fats, stearic acid, oleic acid, palm oil, and petroleum oils are often used to permit effective cold-rolling of steel and to offer some resistance to air oxidation of the steel. These oils are normally applied in thicknesses of 10–20 microinches. Generally, these oils are removed by a solvent wash (degreasing) prior to the application of the various prior art surface coatings. It is this expensive and time-consuming degreasing operation which the present PVC systems obviate insofar as the resin coating of steel is concerned.

In the coating of undergreased steel and other substrates as well, the TMPD or NPG maleate can be used in blends with solvents and/or plasticizers to promote adhesion of PVC fluidized bed coatings to the substrate. For comparison, when a typical fluidized bed coating (see formulation below) is applied to unprimed, ground, cold-rolled steel, it adheres rather poorly having a peel strength of only about ¼ pound per inch. However, when a TMPD maleate blend (see formulation below) is applied to the steel prior to coating with PVC, adhesion of the PVC is increased to about 5 pounds per inch. It is particularly noted that in this procedure, the fusion and blending of the ester and PVC occurs in place on the substrate. It is further noted that when the TMPD maleate is applied first to the substrate, either with or without PVC plasticizers, adhesion between the PVC and the substrate is substantially increased.

TYPICAL FLUIDIZED BED COATING

PVC resin [1] _____ 100
DOP _____ 35
Epox. soybean oil _____ 5
Thermolite 13 _____ 1

[1] Special fluidized bed PVC resins having a specific gravity of 1.40 and a specific viscosity of 0.7 when measured as a 1% solution in cyclohexanone.

TYPICAL TMPD MALEATE "PRE-COAT" SOLUTIONS

| | Percent | | |
|---|---|---|---|
| TMPD maleate (or NPG maleate) | 25 | 50 | 25 |
| Xylene | 25 | | 25 |
| MIAK | 50 | | 25 |
| Di-2-ethylhexyl-phthalate | | 40 | 20 |
| TXIB | | 10 | 5 |

This "pre-coat" method involving application of the maleate first also works effectively with methods other than fluidized bed coating. For example, an ordinary PVC plastisol or organosol may be applied over a substrate coated with the maleate or a maleate/plasticizer blend. The resulting maximum increase in adhesion is of the same order as the maximum increase in adhesion resulting from incorporation of the maleate into the plastisol prior to application. One advantage that the "pre-coat method" has over the "one-coat method" wherein the maleate is preblended with the PVC is the non-variation of adhesion or peel strength with coating thickness. With the "one-coat method," the adhesion of the coating tends to diminish with an increase in coating thickness, especially with coatings of above about 5 mils, while with the "pre-coat method," the adhesion of the coating remains relatively constant regardless of coating thickness.

Examples of seven plastisol formulations testing various polyesters as adhesion improvers are given in the following Table 5. The peel is recorded in pounds per inch required to peel the 1 inch wide, 5 mil thick film from a cold-rolled steel panel at a 180° angle by an Instron Tensile Tester at two inches per minute.

TABLE 5.—PLASTISOL FORMULATIONS CONTAINING UNSATURATED POLYESTERS

| | Examples | | | | | | |
|---|---|---|---|---|---|---|---|
| | 9 | 10 | 11 | 12 | 13 | 14 | 15 |
| PVC dispersion resin | 100 | 100 | 100 | 100 | 100 | 100 | 100 |
| DOP | 10 | 50 | 50 | 80 | 50 | 50 | 75 |
| TXIB | 30 | 20 | 20 | 20 | 20 | 20 | |
| Epoxidized soybean oil | 5 | 5 | 5 | | 5 | 5 | 5 |
| Disbasic lead phthalate | | | | | 5 | | |
| TMPD Maleate | 20 | 20 | 40 | 20 | | | |
| Oxypropylated Bisphenol A polyester | | | | | 40 | | |
| Alkyd resin | | | | | | 20 | |
| Peel | 3 | 1.5 | 4 | 1.5 | <1 | | <¼ |

The characteristics of these formulations 9–15 are as follows:

Example 9.—This formulation gives a relatively hard plastisol film since it contains per 100 parts of PVC only 40 parts of a DOP/TXIB blend and 20 parts of TMPD maleate. The plastisol viscosity is therefore fairly high but may be reduced with a suitable diluent to provide an organosol. The film is tough but only elongates 180% at 70 mils thickness before rupturing. This film could be used in applications requiring toughness and abrasion resistance, but, should not be subjected to extreme alongation, for example, through postforming operations.

Example 10.—This formulation gives a film of medium hardness since it contains per 100 parts of PVC, 70 parts of a DOP/TXIB plasticizer blend and 20 parts of TMPD maleate. The viscosity of this plastisol is slightly lower than that of Example 9, and may also be lowered significanlty by the addition of thinners. The film also has much greater elongation than that of Example 9 and can be successfully postformed.

Example 11.—This formulation is the same as that of Example 10 with the exception that it contains 40 parts of TMPD maleate. Therefore, the adhesion of this film is greater than in the previous examples.

Example 12.—This formulation contains per 100 parts of PVC, 100 parts of a DOP/TXIB plasticizer with only 20 parts of TMPD maleate. It gives a soft plastisol with adequate adhesion for many end uses for this type material. The viscosity is adequately low for most processing applications. Ultimate elongation and low temperature properties of this film are quite good.

Example 13.—For this formulation, an oxypropylated Bisphenol A polyester was substituted for the TMPD maleate in the formulation of Example 11. It gives a plastisol which, when cured, has relatively poor adhesion to the steel and aluminum substrates. The film is also characterized by discoloration.

Example 14.—This formulation represented an attempt to incorporate an alkyd resin into a plastisol system. It was found that this polyester is incompatible with DOP and TXIB and therefore the plastisol could not be prepared. The alkyd resin was prepared by reacting neopentyl glycol, maleic anhydride and trimelletic anhydride in a relative molar ratio of 3.6/1.5/1 to give an alkyd resin having an acid number of 35.

Example 15.—This formulation is a standard for comparison and illustrates the results of omitting the unsaturated polyester.

The following examples further illustrate the criticality of TMPD maleate, HBPA maleate, or NPG maleate in the present PVC systems.

Example 16.—To 400 g. of di-2-ethylhexyl phthalate heated to 150° C. was added with stirring 200 g. of 2,2,4-trimethyl-1,3-pentanediol maleate polyester of molecular weight of about 2000. When solution was complete, the mixture was added with stirring to 1000 g. of PVC resin (Geon 121) and 50 g. epoxidized soybean oil. The resulting plastisol was coated (5 mil film) on cold-rolled steel and cured by heating at 180° C. for 5 minutes. The peel strength of the film as determined on a Thwing-Albert Tensile Tester as pounds necessary to peel a 3-inch strip from the steel at 2 inches per minute was 8 pounds.

Example 17.—The same plastisol was prepared as in Example 16 with the omission of the 2,2,4-trimethyl-1,3-pentanediol maleate polyester. The peel strength of a 5-mil film as determined above was less than 0.25 pound.

Example 18.—The same plastisol described in Example 16 was prepared except that 400 g. of the diisobutyrate of 2,2,4-trimethyl-1,3-pentanediol was substituted for the di-2-ethylhexyl phthalate. The peel strength of a 5-mil film on steel as determined above was 10.5 pounds.

Example 19.—The same plastisol described above in Example 16 was prepared except that 400 g. of the diisobutyrate of 2,2,4-trimethyl-1,3-pentanediol was used as plasticizer and 300 g. of 2,2-dimethyl-1,3-propanediol (NPG) maleate polyester of molecular weight of about 2200 was used as the glycol maleate polyester component. The peel strength of the resulting plastisol as determined above was 7.5 pounds.

Example 20.—The same plastisol described in Example 19 was prepared with the omission of the 2,2-dimethyl-1,3-propanediol maleate polyester. The peel strength of the resulting plastisol was less than 0.25 pound.

It is noted that extensive research on the use of NPG-maleate has also been carried out in the same manner as in the preceding examples with the result that the adhesion of the NPG systems was often found to be higher, in some instances 10–25% higher than systems employing the TMPD-maleate.

TABLE 5A

| | 21 | 22 | 23 | 24 | 25 | 26 |
|---|---|---|---|---|---|---|
| PVC "low soap" dispersion resin | 100 | 100 | 100 | 100 | 100 | 100 |
| DOP | 10 | 50 | 50 | 80 | 50 | 50 |
| TXIB | 30 | 20 | 20 | 20 | 20 | 20 |
| Epoxidized soybean oil | 5 | 5 | 5 | | 5 | 5 |
| Dibasic lead phthalate | | | | | 5 | |
| TMPD Maleate | 25 | 25 | 50 | 25 | | |
| Oxypropylated Bisphenol A polyester | | | | | 40 | |
| Hydrogenated BPA maleate | | | | | | 25 |
| Peel strength | 6 | 6 | 9 | 4 | <1 | 9 |

The characteristics of the formulations 21–26 are set forth in Examples 21–26 which follow. Examples 21–25 are similar to Examples 9–13 and illustrate the excellent results obtained with Tenneco 1730, an especially preferred "low soap" dispersion grade PVC resin. Example 26 illustrates the results obtained when hydrogenated Bisphenol A maleate (HBPA maleate) is the unsaturated polyester employed in the formulation.

Example 21.—This formulation gives a relatively hard plastisol film since it contains per 100 parts of PVC only 40 parts of a DOP/TXIB blend and 25 parts of TMPD maleate. The plastisol viscosity is therefore fairly high but may be reduced with a suitable diluent to provide an organosol. The film is tough but only elongates 180% at 70 mils thickness before rupturing. This film could be used in applications requiring toughness and abrasion resistance, but, should not be subjected to extreme elongation, for example through postforming operations.

Example 22.—This formulation gives a film of medium hardness since it contains per 100 parts of PVC, 70 parts of a DOP/TXIB plasticizer blend and 25 parts of TMPD maleate. The viscosity of this plastisol is slightly lower than that of Example 21, and may also be lowered significantly by the addition of thinners. The film also has much greater elongation than that of Example 9 and can be successfully postformed.

Example 23.—This formulation is the same as that of Example 22 with the exception that it contains 50 parts of TMPD maleate. Therefore, the adhesion of this film is greater than in the previous examples.

Example 24.—This formulation contains per 100 parts of PVC 100 parts of a DOP/TXIB plasticizer with only 25 parts of TMPD maleate. It gives a soft plastisol with adequate adhesion for many end uses for this type material. The viscosity is adequately low for most processing applications. Ultimate elongation and low temperature properties of this film are quite good.

Example 25.—For this formulation, oxypropylated Bisphenol A was substituted for the TMPD maleate in the formulation of Example 23. It gives a plastisol which, when cured, has relatively poor adhesion to the steel and aluminum substrates. The film is also characterized by discoloration.

Example 26.—This formulation is similar to Example 21 with the exception of the use of HBPA maleate in place of TMPD maleate. Physical properties are similar also to Example 21, and adhesion was relatively good to metal substrates.

The following tables 6, 6a, 7, 8, 9, 10 and 10a further illustrate the adhesion improvements achieved by the present invention, and also illustrate useful variations in composition.

TABLE 6.—ADHESION OF VARIOUS PVC ORGANOSOLS 5 MIL FILMS FUSED 10 MIN. 350° F. ON COLD-ROLLED, GROUND STEEL PANELS

| General formulation: | Parts |
| --- | --- |
| PVC dispersion resin | 100 |
| DOP | 25 |
| Polyester (see below) | 25 |
| Dibutyl tin maleate | 1 |
| Solvent | 15 |
| Epoxidized soybean oil | 5 |

| Polyester: | Peel strength [1] |
| --- | --- |
| TMPD maleate | 10 |
| TMPD/IPA/MA polyester [2] | 6 |
| NPG maleate | 12 |
| Dipropyleneglycol maleate [3] | 5 |
| Oxypropylated Bisphenol A | 4 |

[1] Pounds per inch required to peel a 3-inch wide piece of film at 2 in./min.
[2] IPA = isophthalic acid.
[3] Butyl benzyl phthalate substituted for DOP due to compatibility limitations in the formulation.

TABLE 6A.—ADHESION OF VARIOUS PVC ORGANOSOLS 5 MIL FILMS FUSED 10 MIN. 350° F. ON COLD-ROLLED, GROUND STEEL PANELS

| General formulation: | Parts |
| --- | --- |
| PVC "low soap" dispersion resin | 100 |
| DOP | 25 |
| Polyester | 25 |
| Dibutyl tin maleate | 1 |
| Solvent | 15 |
| Epoxidized soybean oil | 5 |

| Polyester: | Peel strength [1] |
| --- | --- |
| TMPD maleate | 7 |
| TMPD/IPA/MA polyester [2] | 3 |
| NPG maleate | 9 |
| HBPA maleate | 10 |
| Dipropyleneglycol maleate [3] | 2 |
| Oxypropylated Bisphenol A | 2 |

[1] Pounds per inch required to peel a 1-inch wide strip of film at 2 in./min. Peel strength values in Table 6a are directly comparable with similar values in Tables 7, 8, 9, 10a, and 11 but must be multiplied by 3 for comparison with similar values in Tables 6 and 10.
[2] IPA = isophthalic acid. MA = maleic acid.
[3] Butyl benzyl phthalate substituted for DOP due to compatibility limitations in the formulation.

TABLE 7.—THIS TABLE ILLUSTRATES THAT THE HIGHER PROPORTIONS OF TMPD MALEATE TO PLASTICIZER GENERALLY PROVIDES GREATER ADHESION OF THE PLASTISOL TO THE SUBSTRATE.

| General Formulation | Parts |
| --- | --- |
| PVC dispersion resin | 100 |
| Dibutyl tin maleate | 1 |
| DOP | As shown |
| TMPD maleate | As shown |
| Solvent | As required |
| Epoxidized soybean oil | 5 |

| Variable component | Parts | | | | | | |
| --- | --- | --- | --- | --- | --- | --- | --- |
| DOP | 75 | 75 | 75 | 75 | 50 | 50 | 25 |
| TMPD maleate | 0 | 20 | 40 | 60 | 25 | 50 | 25 |

| Substrate | Pounds Per Inch [1] | | | | | |
| --- | --- | --- | --- | --- | --- | --- |
| Cold-rolled, ground steel | ¼ | 4 | 5 | 6 | 5 | 10 | [2] F.R. |
| Polished aluminum | ¼ | 1.5 | 2 | 2.4 | 2.2 | 4 | 6 |
| Sanded aluminum | ¼ | 3 | 3.3 | 3.9 | 4 | 8 | F.R. |
| Glass plate | ¼ | 1 | 1.3 | 1.7 | 1.5 | 2 | 6 |
| Glazed ceramic | ¼ | 1.0 | 1.8 | 1.9 | 1.8 | 2.3 | 5 |
| Nylon taffeta | ¼ | 1.1 | 1.8 | 2.9 | 4 | 8 | 10 |

[1] Pounds per inch required to pull a one inch wide, 5 mil thick, fused, vinyl film from a ground, cold-rolled, steel plate at two inches per minute. Peel strength values are directly comparable with similar values in Tables 6a, 8, 9, 10a, and 11 but must be multiplied by 3 for comparison with similar values in Tables 6 and 10.
[2] Film ruptured.

TABLE 8.—EXTRACTION DATA FROM PVC ORGANOSOLS USING POLYMERIC PLASTICIZERS

| General Formulation | Parts |
| --- | --- |
| PVC dispersion resin | 100 |
| TMPD maleate | As shown |
| Plasticizer | As shown |
| Dibutyl tin maleate | 1 |
| Solvent | As required for coating |
| Epoxidized soybean oil | 5 |

| Variable Component | Parts | | | | | |
| --- | --- | --- | --- | --- | --- | --- |
| TMPD maleate | 25 | 37½ | 50 | 25 | 37½ | 50 |
| Eastman Polymeric 864 [1] | 25 | 37½ | 50 | | | |
| TXIB | | | | 25 | 37½ | 50 |

| Properties | | | | | | |
| --- | --- | --- | --- | --- | --- | --- |
| Film thickness, mils | 7.0 | 8.0 | 9.0 | 7.0 | 9.0 | 9.0 |
| Soapy water extraction, loss percent | 0.1 | 0.1 | 0.1 | 0.3 | 0.1 | 0.3 |
| Oil extraction, loss percent | 0.1 | 0.4 | 0.5 | 0.6 | 1.8 | 2.5 |
| Heptane extraction, loss percent | 4.7 | 5.2 | 8.4 | 14.0 | 18.0 | 21.0 |
| Activated carbon extraction, loss percent | 0.2 | 0.2 | 0.2 | 0.4 | 0.4 | 0.4 |
| Peel strength [2] lb./in | (3) | 9.0 | 10.0 | (3) | 9.0 | 10.0 |

[1] Eastman Polymeric 864 is representative of commercial polymeric plasticizer and is prepared by reacting TMPD with adipic acid and terminating with the monoisobutyrate of TMPD to give a molecular weight of approximately 1,000 as measured by boiling point rise.
[2] Peel strength required to peel films from cold-rolled ground steel. Peel strength values directly comparable with similar values in Tables 6a, 9, 10a and 11, but must be multiplied by 3 for comparison with similar values in Tables 6 and 10.
[3] Ruptured.

TABLE 9.—POLYESTER-PLASTICIZER CONCENTRATION RANGES

| General Formulation | Parts |
|---|---|
| PVC dispersion resin | 100 |
| DOP | As shown |
| TMPD maleate | As shown |
| Dibutyl tin maleate | 1 |
| Solvent | As required for coating |
| Epoxidized soybean oil | 5 |

| DOP (Phr.[1]) | TMPD maleate (Phr.) | Pounds Per Inch [2] |
|---|---|---|
| 75 | 0 | <¼ |
| 75 | 20 | 4 |
| 75 | 40 | 5 |
| 75 | 60 | 6 |
| 50 | 0 | <¼ |
| 50 | 25 | 5 |
| 50 | 50 | 10 |
| 25 | 0 | <¼ |
| 25 | 25 | ([3]) |

[1] Phr.=parts per 100 parts of PVC resin.
[2] Pounds per inch required to pull a one inch wide, 10 mil thick, fused, vinyl film from a ground, cold-rolled, steel plate at two inches per minute. Peel strength values directly comparable with similar values in Tables 6a, 7, 8, 10a, 11, but must be multiplied by 3 for comparison with similar values in Tables 6 and 10.
[3] Film ruptures.

TABLE 10.—PEEL STRENGTH OF PVC FILMS FROM COLD-ROLLED STEEL PLATE AFTER FUSING 5 MIN. AT 180° F.

| Plasticizer (Phr.) | | Polyester (Phr.) | Pounds Peel [1] |
|---|---|---|---|
| DOP | TXIB | | |
| 10 | 30 | 20 TMPD Maleate | 8 |
| 50 | 20 | 20 MTPD Maleate | 3 |
| 50 | 20 | 40 TMPD Maleate | [2] 10–12 |
| 80 | 20 | 20 TMPD Maleate | 4 |
| 50 | 20 | 40 Oxypropylated Bisphenol A | <1 |
| Any ratio | | 0 | <¼ |

[1] Measured on a Thwing-Albert Tensile Tester as pounds necessary to peel a three-inch strip from cold-rolled steel at two inches per minute. Faster rates of stripping gave correspondingly higher values.
[2] PVC film was left coated on the steel as this sample was peeled off.

TABLE 10A.—PEEL STRENGTH OF PVC FILMS (LOW "SOAP" PVC) FROM COLD-ROLLED STEEL PLATE AFTER FUSING 5 MIN. AT 180° F.

| Plasticizer (Phr.) | | Polyester (Phr.) | Pounds Peel [1] |
|---|---|---|---|
| DOP | TXIB | | |
| 10 | 30 | 20 TMPD Maleate | 5 |
| 50 | 20 | 20 TMPD Maleate | 3 |
| 50 | 20 | 40 TMPD Maleate [2] | 8–10 |
| 80 | 20 | 20 TMPD Maleate | 4 |
| 50 | 20 | 40 HBPA Maleate [2] | >10 |
| Any Ratio | | 0 | <¼ |

[1] Measured on a Thwing-Albert Tensile Tester as pounds necessary to peel a one-inch wide strip from cold-rolled steel at two inches per minute. Faster rates of stripping gave correspondingly higher values. Peel strength values are directly comparable with similar values in Tables 6a, 7, 8, 9, and 11, but must be multiplied by 3 for comparison with peel strength values in Tables 6 and 10.
[2] PVC film was left coated on the steel as these samples were peeled off.

TABLE 11.—EFFECTS OF STABILIZERS UPON PVC ADHESION

| General Formulation | Parts |
|---|---|
| PVC dispersion resin | 100 |
| DOP | 50 |
| TMPD maleate | 40 |
| Epoxidized soybean oil | 5 |
| Stabilizer | As shown |

| Stabilizer | Parts | Pounds Per Inch [1] |
|---|---|---|
| Dibasic lead phthalate | 5 | 7 |
| Ferro [2] 5002 | 2 | 1 |
| Ferro [3] 5031 | 2 | 1 |
| Argus [4] Q189E | 2 | 1 |
| Mark [5] 275 | 2 | 5 |
| Mark [6] X-36 | 2 | 1 |
| Nuostabe [7] V-1008 | 2 | 1 |
| Nuostabe [8] V-1038 | 2 | 1 |
| Nuostabe [9] V-1060 | 2 | 1 |
| Dibutyl tin maleate | 1 | 10 |

[1] Pounds per inch required to peel a 1-inch wide 5 mil thick film from cold-rolled, ground steel at 2 in./min. Peel strength values are directly comparable with similar values in Tables 6a, 7, 8, 9, and 10a, but must be multiplied by 3 for comparison with peel strength values in Tables 6 and 11.
[2] Ba, Cd, liquid orgainc inhibitor, sg. 1.01, of Ferro Chemical Corp.
[3] Cd, Zn, liquid organic inhibitor, sg. 1.02, of Ferro Chemical Corp.
[4] Ba, Cd, Zn, liquid phenate complex, sg. 1.02, of Argus Chemical Corp.
[5] Sn, liquid organic complx, sg. 1.13 of Argus Chemical Corp.
[6] Ba, Cd, Zn, liquid phenate, sg. 0.990 of Argus Chemical Corp.
[7] Ba, Cd, Zn, liquid organic complex, sg. 1.038, of Nuodex division of Heyden Newport Chemical Company.
[8] Ba, Cd, Zn, liquid organic complex, sg. of 0.961, of Nuodex division of Heyden Newport Chemical Company.
[9] Ba, Cd, Zn, liquid phosphate complex of Nuodex division of Heyden Newport Chemical Company.

The invention has been described in detail with particular reference to preferred embodiments thereof, but, it will be understood that variations and modifications can be effected within the spirit and scope of the invention described hereinabove and in the appended claims. While the specific examples are drawn to PVC resins, the invention is also applicable to copolymers of vinyl chloride and vinyl acetate or vinylidine chloride containing at least 50% by weight of vinyl chloride.

We claim:

1. A vinyl chloride resin composition having enhanced adhesion to substrates comprising a vinyl chloride polymer, a plasticizer for said vinyl chloride polymer, and from about 10 to 60 parts per hundred parts of said polymer of an unsaturated polyester having a molecular weight of up to about 4000 of a dibasic acid and a diol which is solid at room temperature and which consists essentially of recurring units having the formula $(-G-A_1-G-A_2)$ wherein G is a divalent residue of a diol selected from the group consisting of 2,2,4-trimethyl-1,3-pentanediol, 2,2-bis(4-hydroxycyclohexyl) propane, and 2,2-dimethyl-1,3-propanediol, $A_1$ is a divalent residue of a dibasic acid selected from the group consisting of fumaric, maleic, itaconic, mesaconic, and citraconic acid, and $A_2$ is a divalent residue of a dibasic acid selected from the group consisting of fumaric, maleic, itaconic, mesaconic, citraconic, o-phthalic, isopthalic, terephthalic, tetrahydrophthalic, adipic, succinic, azelaic, sebacic, suberic, and glutaric acid.

2. A vinyl chloride resin composition according to claim 1 wherein said diol is 2,2,4-trimethyl-1,3-pentanediol.

3. A vinyl chloride resin composition according to claim 1 wherein said diol is 2,2-bis(4-hydroxycyclohexyl) propane.

4. A vinyl chloride resin composition according to claim 1 wherein said diol is 2,2-dimethyl-1,3-propanediol.

5. A vinyl chloride resin composition according to claim 1 wherein said polymer is polyvinyl chloride and wherein $A_2$ is a divalent residue of an unsaturated dibasic acid selected from the group consisting of fumaric, maleic, itaconic, mesaconic and citraconic acid.

6. A polyvinyl chloride composition as claimed in claim 5 wherein said unsaturated dibasic acid is maleic acid.

7. A composition according to claim 1 in which the composition also contains across-linking system for said unsaturated polyester.

8. A vinyl chloride resin composition according to claim 7 wherein said cross linking system comprises at least one material selected from the group consisting of 1,3-butylene glycol dimethacrylate, diallylphthalate, the monomethacrylate and dimethacrylate of 2,2,4-trimethyl-1,3-pentanediol and mixtures thereof, and the monomethacrylate and dimethacrylate of 2,2 - dimethyl - 1,3-propanediol and mixtures thereof.

9. A composition according to claim 7 in which the unsaturated polyester is a polyester of maleic acid and 2,2,4-trimethyl-1,3-pentanediol having a molecular weight of about 1000 to about 3000.

10. A composition according to claim 7 in which the unsaturated polyester is a polyester of maleic acid and 2,2-dimethyl-1,3-propanediol having a molecular weight of about 1000 to about 3000.

11. A composition according to claim 7 in which the unsaturated polyester is a polyester of maleic acid and 2,2-bis(4-hydroxycyclohexyl)propane having a molecular weight of about 1000 to about 3000.

12. A composition according to claim 1 in which the polymeric material is polyvinyl chloride and in which the unsaturated polyester is a polyester of maleic acid and 2,2,4-trimethyl-1,3-pentanediol having a molecular weight of about 1000 to about 3000.

13. A composition according to claim 12 in which said composition contains about 30 to about 100 parts of a plasticizer per 100 parts of polyvinyl chloride.

14. A composition according to claim 1 in which the polymeric material is polyvinyl chloride and in which the unsaturated polyester is a polyester of maleic acid and 2,2-dimethyl-1,3-propanediol having a molecular weight of about 1000 to about 3000.

15. A composition according to claim 14 in which said composition contains about 30 to about 100 parts of a plasticizer per 100 parts of polyvinyl chloride.

16. A composition according to claim 1 in which the polymeric materials is polyvinyl chloride and in which the unsaturated polyester is a polyester of maleic acid and 2,2-bis(4-hydroxycyclohexyl)propane having a molecular weight of about 1000 to about 3000.

17. A composition according to claim 16 in which said composition contains about 30 to about 100 parts of a plasticizer per 100 parts of polyvinyl chloride.

18. A composition according to claim 1 in which the polymeric material is polyvinyl chloride and in which the unsaturated polyester is a polyester of maleic acid, isophthalic acid, 2,2 - bis(4-hydroxycyclohexyl)propane, and 2,2,4-trimethyl-1,3-pentanediol having a molecular weight of about 1000 to about 3000.

19. A composition according to claim 18 in which said composition contains about 30 to about 100 parts of a plasticizer per 100 parts of polyvinyl chloride.

20. A composition capable of rendering vinyl chloride resin compositions adherent to substrates comprising a vinyl chloride resin plasticizer and from 5 to 75 parts per 100 parts of plasticizer of a polyester having a molecular weight of up to about 4000 which is solid at room temperature and which is a polyester of a diol and a dibasic acid, said polyester consisting essentially of recurring units having the formula $(-G-A_1-G-A_2)$ wherein G is a divalent residue of a diol selected from the group consisting of 2,2,4-trimethyl-1,3-pentanediol, 2,2-bis(4-hydroxycyclohexyl) propane, and 2,2-dimethyl-1,3-propanediol, $A_1$ is a divalent residue of a dibasic acid selected from the group consisting of fumaric, maleic, itaconic, mesaconic, and citraconic acid, and $A_2$ is a divalent residue of a dibasic acid selected from the group consisting of fumaric, maleic, itaconic, mesaconic, citraconic, o-phthalic, isophthalic, terephthalic, tetrahydrophthalic, azelaic, sebacic, suberic, and glutaric acid.

21. A composition according to claim 20 wherein said plasticizer is selected from the group consisting of di-(2-ethylhexyl) phthalate, di-(2-ethyl-4-methylpentyl) phthalate, and 2,2,4-trimethyl-pentane-1,3-diol diisobutyrate.

22. A method of increasing the adhesion of a polyvinyl chloride composition comprising the step of blending a vinyl chloride resin composition comprising a vinyl chloride polymer with a plasticizer for said vinyl chloride polymer and with from about 10 to 60 parts per 100 parts of said polymer of an unsaturated polyester having a molecular weight of up to about 4000 of a dibasic acid and a diol which is solid at room temperature and which consists essentially of recurring units having the formula $(-G-A_1-G-A_2)$ wherein G is a divalent residue of a diol selected from the group consisting of 2,2,4-trimethyl - 1,3 - pentanediol, 2,2-bis(4-hydroxycyclohexyl) propane and 2,2-dimethyl-1,3-propanediol, $A_1$ is a divalent residue of a dibasic acid selected from the group consisting of fumaric, maleic, itaconic, mesaconic, and citraconic acid, and $A_2$ is a divalent residue of a dibasic acid selected from the group consisting of fumaric, maleic, itaconic, mesaconic, citraconic, o-phthalic, isophthalic, terephthalic, tetrahydrophthalic, adipic, succinic, azelaic, sebacic, suberic and glutaric acid.

23. A method according to claim 22 wherein said polymer is polyvinyl chloride.

24. A method according to claim 23 wherein said unsaturated polyester is blended with said plasticizer prior to being blended with said polyvinyl chloride.

25. A method according to claim 22 wherein $A_2$ is a divalent residue of an unsaturated dibasic acid selected from the group consisting of maleic, fumaric, mesaconic, itaconic and citraconic acid.

26. An article including a surface coated with the composition of claim 1, said coating adhering to said surface, and said surface being of a material selected from the group consisting of metal, ceramic, glass, wood and plastic.

27. An article according to claim 26 wherein said surface is steel.

References Cited

UNITED STATES PATENTS

| | | | |
|---|---|---|---|
| 2,647,099 | 7/1953 | Smith | 260—873 |
| 2,744,877 | 5/1956 | Smith | 260—31.6 |
| 3,091,597 | 5/1963 | Henriques | 260—873 |
| 3,149,087 | 9/1964 | Anagnostopoulos et al. | 260—31.6 |
| 3,160,599 | 12/1964 | Scullin | 260—31.6 |
| 3,167,524 | 1/1965 | Lauck et al. | 260—31.6 |

JULIUS FROME, *Primary Examiner.*

MORRIS LIEBMAN, *Examiner.*

L. T. JACOBS, *Assistant Examiner.*

UNITED STATES PATENT OFFICE
CERTIFICATE OF CORRECTION

Patent No. 3,376,246　　　　　　　　　　　April 2, 1968

David L. Valentine et al.

It is certified that error appears in the above identified patent and that said Letters Patent are hereby corrected as shown below:

Column 2, line 50, "abelaic" should read -- azelaic --. Column 3, line 58, "clasified" should read -- classified --. Column 7, line 10, "dially" should read -- diallyl --. Column 9, line 67, "significanlty" should read -- significantly --. Column 13, TABLE 10, third column, line 2 thereof, "20 MTPD Maleate" should read -- 20 TMPD Maleate --. Column 14, TABLE 11, footnote 2 thereof, "orgainc" should read -- organic --.

Signed and sealed this 19th day of August 1969.

(SEAL)
Attest:

Edward M. Fletcher, Jr.
Attesting Officer

WILLIAM E. SCHUYLER, JR.
Commissioner of Patents